(12) United States Patent
Buck et al.

(10) Patent No.: US 8,149,245 B1
(45) Date of Patent: Apr. 3, 2012

(54) ADAPTIVE LINEAR CONTRAST METHOD FOR ENHANCEMENT OF LOW-VISIBILITY IMAGERY

(75) Inventors: David L. Buck, San Diego, CA (US); Brian T. Williams, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 705 days.

(21) Appl. No.: 12/336,300

(22) Filed: Dec. 16, 2008

(51) Int. Cl.
*G09G 5/06* (2006.01)

(52) U.S. Cl. ........ 345/601; 345/590; 345/602; 345/617; 382/168; 382/171; 382/254; 382/270; 382/274

(58) Field of Classification Search .................. 345/590, 345/601, 602, 617; 382/168, 171, 254, 270, 382/274
See application file for complete search history.

(56) References Cited

U.S. PATENT DOCUMENTS

| | | | |
|---|---|---|---|
| 5,793,888 A * | 8/1998 | Delanoy | 382/219 |
| 6,674,436 B1 * | 1/2004 | Dresevic et al. | 345/472 |
| 6,771,814 B1 * | 8/2004 | Nakajima | 382/168 |
| 7,233,696 B2 * | 6/2007 | Hill et al. | 382/181 |
| 7,885,462 B2 * | 2/2011 | Paik | 382/168 |
| 2002/0015536 A1 * | 2/2002 | Warren et al. | 382/284 |

OTHER PUBLICATIONS

Sepasian, Mojtaba et al.; Novel Fingerprint Image Enhancement Algorithm; 2008; Advances in Electrical and Electronics Engineering—IAENG Special Edition of the World Congress on Engineering and Computer Science.*

* cited by examiner

*Primary Examiner* — Xiao M. Wu
*Assistant Examiner* — Todd Buttram
(74) *Attorney, Agent, or Firm* — Ryan J. Friedl; Kyle Eppele

(57) ABSTRACT

A method may include the steps of segmenting an image into a plurality of tiles, calculating an upper clip limit and a lower clip limit for each tile of the plurality of tiles based upon a user input standard deviation, generating a lookup table for each tile of the plurality of tiles by linearly mapping the pixels of the image based upon the calculated upper clip limit and lower clip limit, processing each tile of the plurality of tiles based upon the generated lookup table, and generating a processed image by combining each of the processed tiles. The method may include the steps of scaling the image between zero and one and/or scaling the image based upon the display type. The method may be stored on a computer readable medium and may be used in an image processing system having memory, a processor, and a display.

20 Claims, 7 Drawing Sheets

ADAPTIVE LINEAR CONTRAST METHOD FOR ENHANCEMENT OF LOW-VISIBILITY IMAGERY

FEDERALLY-SPONSORED RESEARCH AND DEVELOPMENT

The Adaptive Linear Contrast Method for Enhancement of Low-Visibility Imagery was developed with Federal funds and is assigned to the United States Government. Licensing inquiries may be directed to Office of Research and Technical Applications, Space and Naval Warfare Systems Center, San Diego, Code 2112, San Diego, Calif., 92152; telephone 619-553-2778; email: T2@spawar.navy.mil. Reference Navy Case No. 99612

BACKGROUND OF THE INVENTION

Adverse visibility conditions, such as haze, smog, dust, and smoke, and adverse weather conditions, such as fog, snow, and rain, reduce the ability for current image-recognition devices to accurately detect objects. In the littoral environment, the reduced visibility caused by adverse visibility and weather conditions can cause catastrophic harm. Further, adverse visibility and weather conditions can significantly impact road visibility for land-based vehicles or air-based vehicles attempting to land at a designated landing zone. There is a need for a method for enhancing imagery detection in low-visibility conditions.

DETAILED DESCRIPTION OF SOME EMBODIMENTS

Figure 1:
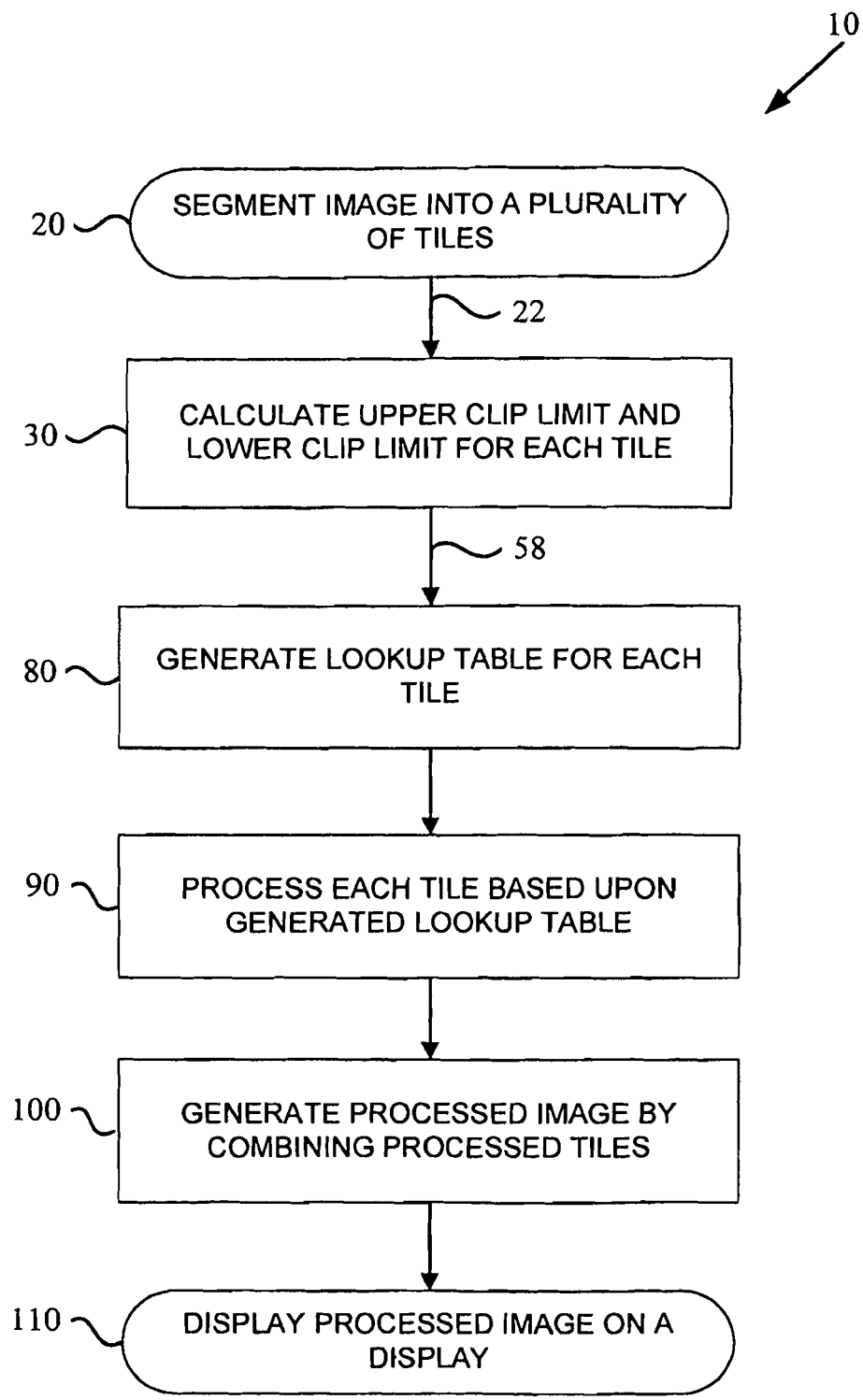
FIG. 1 shows a flowchart of one embodiment of the Adaptive Linear Contrast Method for Enhancement of Low-Visibility Imagery.
Figure 5:
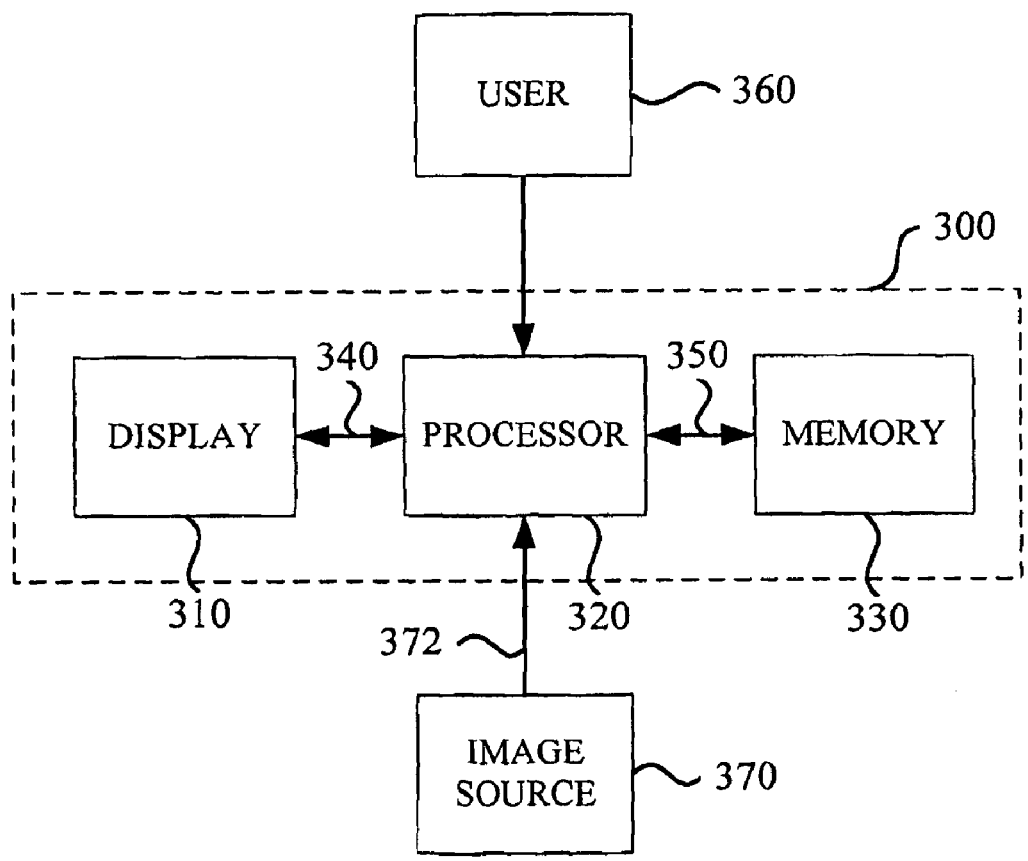
FIG. 5 shows a block diagram of an embodiment of a system for using the Adaptive Linear Contrast Method for Enhancement of Low-Visibility Imagery.
Figure 6:
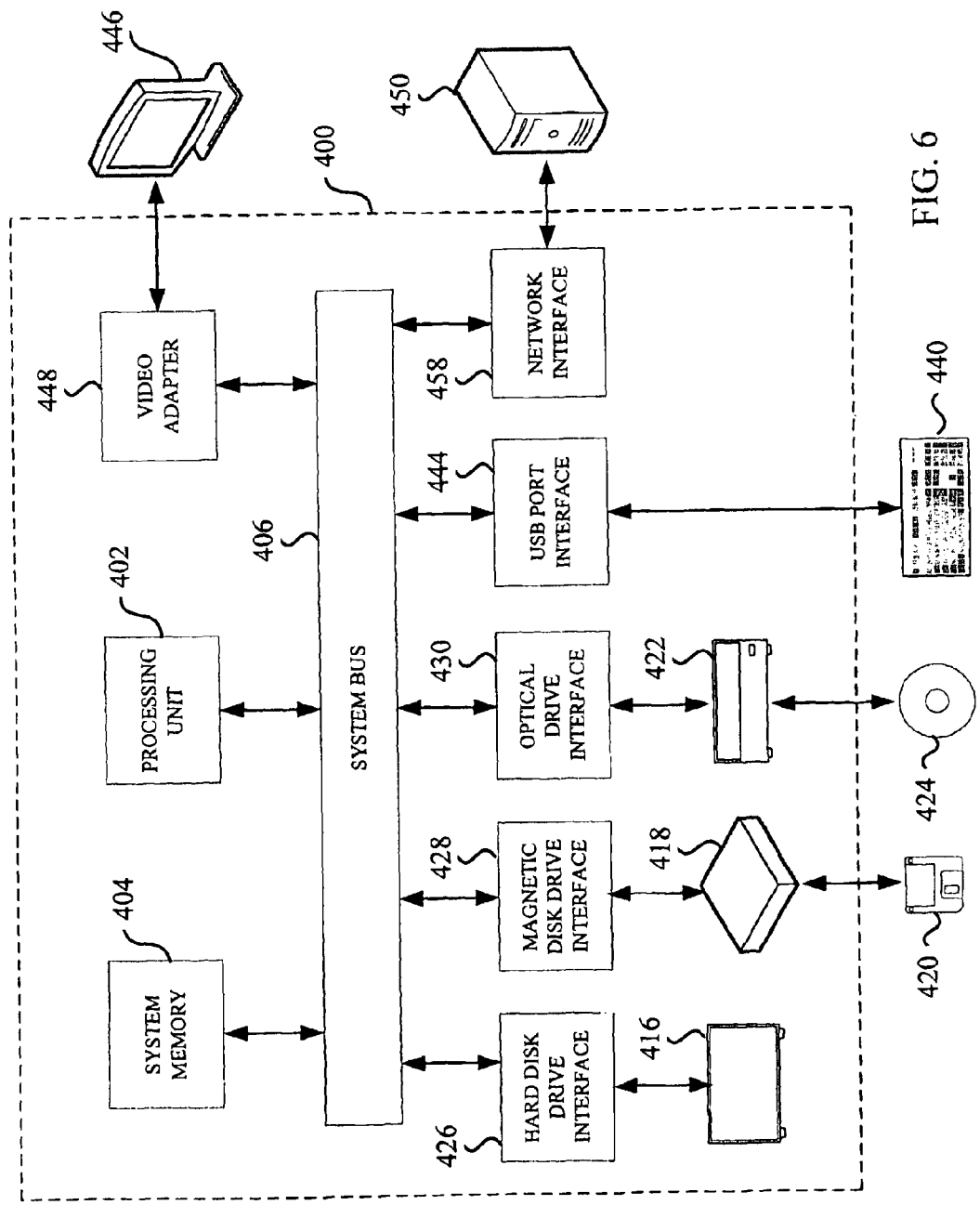
FIG. 6 shows a diagram of an embodiment of another system for using the Adaptive Linear Contrast Method for Enhancement of Low-Visibility Imagery.

Referring to FIG. 1, there is shown a flowchart of one embodiment of the Adaptive Linear Contrast Method for Enhancement of Low-Visibility Imagery 10. Method 10 may be performed by a system such as system 300 as shown in FIG. 5 or system 400 as shown in FIG. 6 and discussed herein. For illustrative purposes, method 10 will be discussed with reference to system 300. In some embodiments, one or more steps of method 10 may be performed by processor 320 using software stored within memory 330. Method 10 may begin at step 20, where an image is segmented into a plurality of tiles. In some embodiments, the processing of step 20 may be performed by the "adapthisteq" function of the MATLAB® software package developed by the The Mathworks Corporation. The image may be received by an image source 370. The image may be segmented into a matrix as discussed with reference to FIG. 7. Method 10 may then proceed along flow path 22 to step 30, where an upper clip limit and a lower clip limit are calculated for each tile. Step 30 is discussed in greater detail with reference to FIGS. 2 and 3.

Following step 30, step 80 involves generating a lookup table for each tile. Step 80 may be performed by linearly mapping the pixels of the image based upon the calculated upper clip limit and lower clip limit. Such a step may include determining the number of equally spaced bins, or output pixel values, to map the input pixels to. The number of bins may be determined based on the display method. For example, displays that display grayscale images typically use 256 different shades of gray. Therefore, the number of bins, or pixel values, in the lookup table would be 256. The lower clip limit would equate to an output in the lookup table of zero, and the upper clip limit would correspond to a value of 255. Any pixel value falling between the clip limits would fall into one of the 254 equally spaced bins between the upper and lower clip limit, which would correspond to output pixel values 1 through 254. Any input values that are below the lower clip limit would be set to an output value of zero. Any input values higher than the upper clip limit would be set to an output value of 255.

Step 90 may then involve processing each tile based upon the generated lookup table. Step 100 may then involve generating a processed image by combining the processed tiles. The calculating, generating, and processing in steps 30, 80, 90, and 100 may occur by processor 320 by software stored either within processor 320 or within memory 330. As an example, steps 30, 80, 90, and 100 may be performed using the MATLAB® software program. Method 10 may then proceed to step 110, where the processed image is displayed on display 310. In some embodiments, step 110 involves displaying the pre-processed image, as well as the processed image, to allow a user to make further image adjustments on the processed image to further enhance the processed image.

Figure 2:
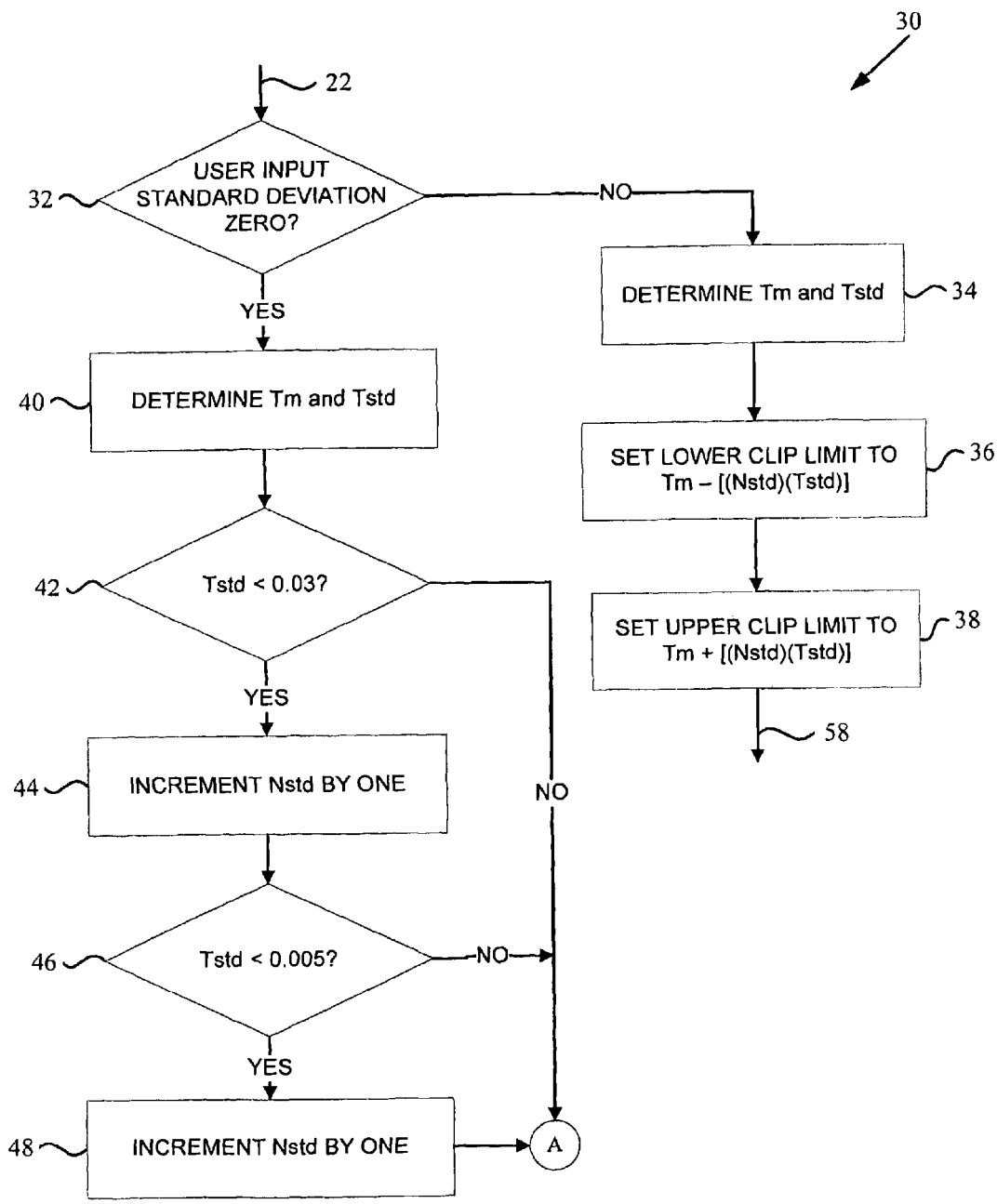
FIG. 2 shows a flowchart of one embodiment of a step for calculating an upper and lower clip limit for each tile of an image, in accordance with the Adaptive Linear Contrast Method for Enhancement of Low-Visibility Imagery.
Figure 3:
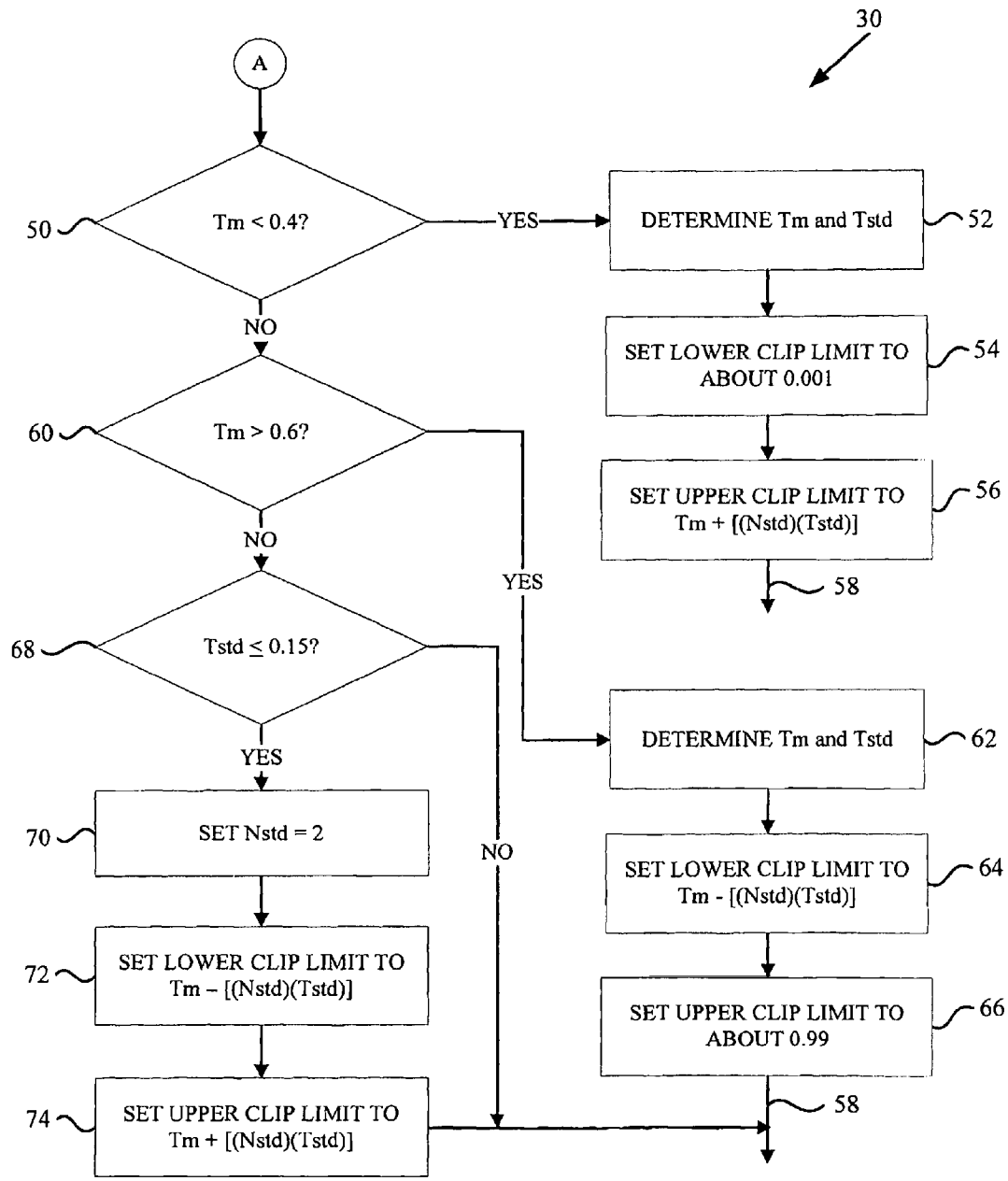
FIG. 3 shows a flowchart of one embodiment of a step for calculating an upper and lower clip limit for each tile of an image, in accordance with the Adaptive Linear Contrast Method for FIG. 4 shows a flowchart of another embodiment of the Adaptive Linear Contrast Method for Enhancement of Low-Visibility Imagery.

Referring to FIGS. 2 and 3, step 30 may begin at step 32, where it is determined whether a user has input a standard deviation number, Nstd, of zero. The value of Nstd may vary depending on the application. As an example, Nstd may vary between the values of zero and five. If Nstd does not equal zero, step 34 involves determining a tile mean, Tm, and a tile standard deviation, Tstd, for each tile. The values for Tm and Tstd may be calculated according to standard calculating techniques. Step 36 may then involve setting a lower clip limit equal to Tm−[(Nstd)(Tstd)]. Step 38 may then involve setting an upper clip limit to Tm+[(Nstd)(Tstd)]. Following step 38, step 30 may proceed to step 80 along flow path 58.

Referring back to step 32, if Nstd equals zero, step 40 may involve determining Tm and Tstd. Step 42 may then involve determining whether Tstd is less than 0.03. In some embodiments, step 40 may involve determining if Tstd is less than a value other than 0.03, such as 0.02 or 0.04. If Tstd is not less than 0.03, step 30 may proceed to step 50. If so, step 44 involves incrementing Nstd by one. Next, step 46 involves determining whether Tstd is less than 0.005. In other embodiments, step 46 involves determining if Tstd is less than a value other than 0.005, such as 0.004 or 0.006. If Tstd is not less than 0.005, step 30 may proceed to step 50. If so, step 48 involves incrementing Nstd again by one. Following step 48, step 30 may proceed to step 50.

Step 50 involves determining whether Tm is less than 0.4. In other embodiments, step 50 may involve determining if Tm is less than a value other than 0.4, such as 0.3 or 0.5. If Tm is less than 0.4, step 52 involves determining Tm and Tstd for each tile. Step 54 then involves setting a lower clip limit equal to about 0.001. Step 56 then involves setting an upper clip limit to Tm+[(Nstd)(Tstd)]. Following step 56, step 30 may proceed to step 80 along flow path 58.

If Tm is not less than 0.4, step 60 involves determining whether Tm is greater than 0.6. In other embodiments, step 60 may involve determining if Tm is greater than a value other than 0.6, such as 0.5 or 0.7. If so, step 30 may proceed to step 62, which involves determining Tm and Tstd for each tile. Step 64 may then involve setting a lower clip limit equal to Tm−[(Nstd)(Tstd)]. Step 66 may then involve setting an upper clip limit to about 0.99. Following step 66, step 30 may proceed to step 80 along flow path 58.

If Tm is not greater than 0.6, step 68 involves determining whether Tstd is less than or equal to 0.15. In other embodiments, step 68 involves determining if Tstd is less than or equal to a value other than 0.15, such as 0.10 or 0.20. If it is not, step 30 may proceed to step 80 along flow path 58. If Tm is less than or equal to 0.15, step 70 involves setting Nstd equal to a value of two. Then, step 72 involves setting a lower clip limit equal to Tm−[(Nstd)(Tstd)]. Step 74 then involves setting an upper clip limit to Tm+[(Nstd)(Tstd)]. Following step 74, step 30 may proceed to step 80 along flow path 58.

In some embodiments, step 30 may also involve mapping each tiles calculated upper clip limit and lower clip limit back into the tiles original clip limits using the tiles original Tm and Tstd.

Figure 4:
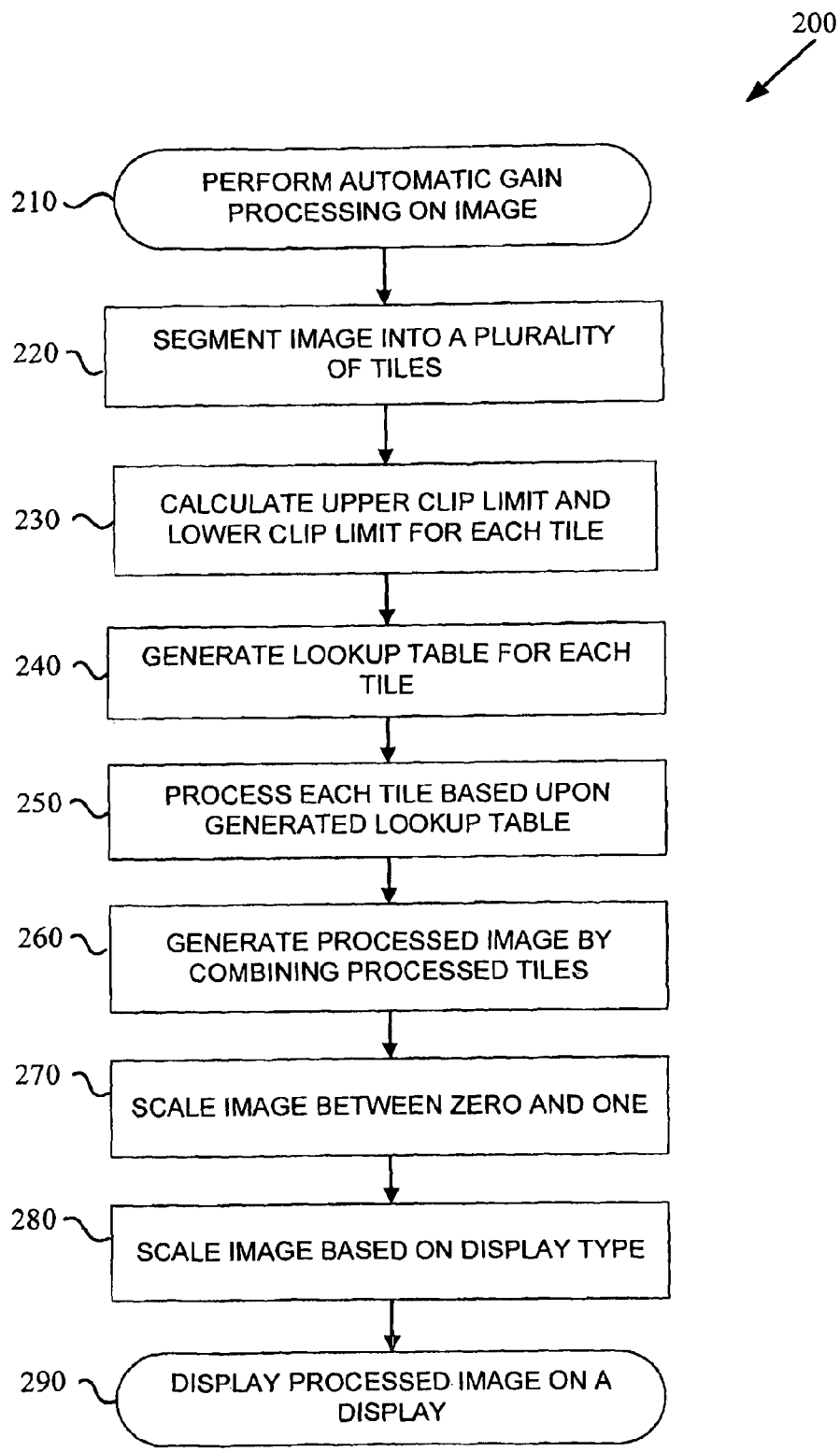

Referring to FIG. 4, there is shown a flowchart of one embodiment of the Adaptive Linear Contrast Method for Enhancement of Low-Visibility Imagery 200. Method 200 may be performed by a system such as system 300 as shown in FIG. 5 or system 400 as shown in FIG. 6 and discussed herein. For illustrative purposes, method 200 will be discussed with reference to system 300. In some embodiments, one or more steps of method 200 may be performed by processor 320 using software stored within memory 330.

Method 200 may begin at step 210, where automatic gain processing is performed on an image. As an example, step 210 may involve processing an image according to the System and Method for Enhancing Low-Visibility Imagery described in U.S. Non-provisional patent application Ser. No. 11/952,041, filed Dec. 6, 2007. Next, step 220 involves segmenting the image into a plurality of tiles. Step 220 may be performed similar to step 20 of method 10. Step 230 may then involve calculating an upper clip limit and a lower clip limit for each tile of the image. Step 230 may be performed similar to step 30 of method 10. Step 240 may then involve generating a lookup table for each tile. Step 240 may be performed similar to step 80 of method 10. Step 250 may then involve processing each tile based upon the generated lookup table. Step 250 may be performed similar to step 90 of method 10. Step 260 may then involve generating a processed image by combining the processed tiles. Step 260 may be performed similar to step 100 of method 10.

Next, step 270 involves scaling the image between zero and one. Step 270 may be performed according to generally accepted image scaling techniques, so long as the technique allows for image scaling between the values zero and one. Step 280 involves scaling the image based on the display type. As an example, step 280 may involve scaling the image to be displayed on an 8-bit display. Step 290 then involves displaying the processed image on display 310. In some embodiments, step 290 involves displaying the pre-processed image, as well as the processed image, to allow a user to make further image adjustments on the processed image to further enhance the processed image.

FIG. 5 shows a block diagram of one embodiment of a system 300 that may be used to implement the embodiments of the Adaptive Linear Contrast Method for Enhancement of Low-Visibility Imagery. System 300 may include a display 310, a processor 320, and a memory module 330. Display 310 and processor 320 may communicate via connection 340. Processor 320 and memory 330 may communicate via connection 350. Connections 340 and 350 may be wired or wireless. Display 310 may comprise any type of display as recognized by one having ordinary skill in the art. For example, display 310 may be a liquid crystal display, which may be commercially obtained from NEC, model number ASLCD72VX-BK-TA. Display 310 may be configured to display one or multiple images received from image source 370. In some embodiments, processor 320 may comprise any type of processing unit as recognized by one having ordinary skill in the art. For example, processor 320 may be a chip that may be commercially obtained from AMD, model number AMD A64 3200. Processor 320 may retrieve program instructions from memory module 330 to perform steps of methods 10 and 200 as described herein.

Memory module 330 may comprise any type of memory module as recognized by one having ordinary skill in the art. For example, memory module 330 may be DDR3 SDRAM, which may be commercially obtained from Samsung Corporation. Memory module 330 may contain program instructions stored therein. The program instructions may be executable by processor 320 to perform methods 10 and 200. In some embodiments, processor 320 and memory module 330 reside within the same chip. A user 360 may interact with system 300 via display 310. As an example, user 360 may input information into system 300 via a keyboard, mouse, or other input device, as well as view pre-processed and processed images displayed on display 310.

Image source 370 may be operatively connected to processor 320 to transmit images to system 300 via connection 372. In some embodiments, image source 370 may be a video camera. For example, image source 370 may be a long-wave infrared camera, mid-wave infrared camera, or short-wave infrared camera. An example of a long-wave infrared camera suitable for use with system 300 is the BAE LTC550 developed by BAE Systems Corporation. In embodiments where image source 370 is a video camera, image source 370 may operate in other bands of the EM spectrum, such as the visible band. In some embodiments, image source 370 may operate in multiple bands of the EM spectrum. Image source 370 may be either an analog or digital camera. In some embodiments, image source 370 may be a still image camera. Connection 372 may be a wired or wireless connection.

In some embodiments, a system that may be used to implement methods 10 and 200 may comprise more than one image source, more than one processor, and more than one display. In such embodiments, each image source may operate in a specific band of the electromagnetic spectrum. In other embodiments, one or more image sources may be analog video cameras and one or more image sources may be digital video cameras. In such embodiments, each image source may be connected to a separate processor and display. In other embodiments, each image source may be connected to the same processor, with the processor being connected to multiple displays, where images from each individual image source are displayed on separate displays.

FIG. 6 shows an embodiment of a system 400 that may be used to implement a method for enhancing low-visibility imagery. FIG. 6 and the following description are intended to provide a brief, general description of a suitable computing environment in which the embodiments of the Adaptive Linear Contrast Method for Enhancement of Low-Visibility Imagery may be implemented. The embodiments of the Adaptive Linear Contrast Method for Enhancement of Low-Visibility Imagery will be described in the general context of computer-executable instructions, such as program modules, being executed by a computer.

Generally, program modules include routines, programs, objects, components, information structures, etc. . . . , that perform particular tasks or implements particular abstract information types. Moreover, those skilled in the art will appreciate that embodiments of the method for enhancing low-visibility imagery may be practiced with other computer system configurations, including hand-held devices, multi-processor systems, microprocessor-based or programmable consumer electronics, network personal computers, mini-computers, mainframe computers, and the like. Embodiments of the method may also be practiced in distributed computing environments where tasks are performed by remote processing devices that are linked through a communications network. In a distributed computing environment, program modules may be located on both local and remote memory storage devices.

In some embodiments, system 400 includes processing unit 402, system memory 404 and system bus 406 that operatively couple various system components to other system components (e.g., system bus 406 operatively couples system memory 404 to processing unit 402). Examples of system bus 406 include a memory bus, memory bus controller, peripheral bus and local bus using any of a variety of known bus structures. System memory 404 may include RAM, ROM, and basic input/output system. In some embodiments, system 400 comprises a computing device specifically configured to run the embodiments of the Adaptive Linear Contrast Method for Enhancement of Low-Visibility Imagery. In other embodiments, system 400 comprises a general purpose computing device, such as a personal computer.

System 400 further includes hard disk drive 416 for reading from and writing to a hard disk (not shown in FIG. 8) a magnetic disk drive 418 for reading from or writing to a removable magnetic disk 420 (e.g., 4.5-inch disk), and an optical disk drive 422 for reading from and writing to a removable optical disk 424 (e.g., CD-ROM and DVD). Hard disk drive 416, magnetic disk drive 418 and optical disk drive 422 are operatively connected to system bus 406 via hard disk drive interface 426, magnetic disk drive interface 428 and optical drive interface 430, respectively. The drives and their associated computer-readable media provide nonvolatile storage of computer readable instructions, information structures, program modules and other information for personal computer 400. The method steps of embodiments of the present method may be stored on a hard disk, magnetic disk 420 and optical disk 424. Although the exemplary environment described herein employs a hard disk, magnetic disk 420 and optical disk 424, it should be appreciated by those skilled in the art that other types of computer readable media that may store information accessible by a computer, (e.g., magnetic cassettes, flash memory cards, digital video disks, Bernoulli cartridges, random access memories and read only memories) may also be used in the exemplary operating environment without departing from the scope or spirit of embodiments of the method.

A user may enter commands and information into system 400 via input devices such as keyboard 440 and pointing devices (e.g., mouse and trackball) (not shown in FIG. 6). Examples of input devices (not shown in FIG. 6) include a microphone, joystick, game pad, and satellite dish. Input devices may be operatively connected to processing unit 402 via universal serial bus (USB) port interface 444 that is operatively connected to system bus 406. Input devices may also be operatively connected to processing unit 402 via other interfaces (e.g., parallel port, serial port and game port) that are operatively connected to system bus 406. Monitor 446 is operatively connected to system bus 406 via video adapter 448. Other peripheral devices (e.g., speakers and printers) may be operatively connected to system 400 via other interfaces. System 400 may operate in a networked environment using logical connections to one or more remote computers such as remote computer 450 via network a network, such as a local area network, wide area network, and wireless network. Examples of remote computer 450 include a personal computer, server, router, network personal computer, peer device and network node.

Figure 7:
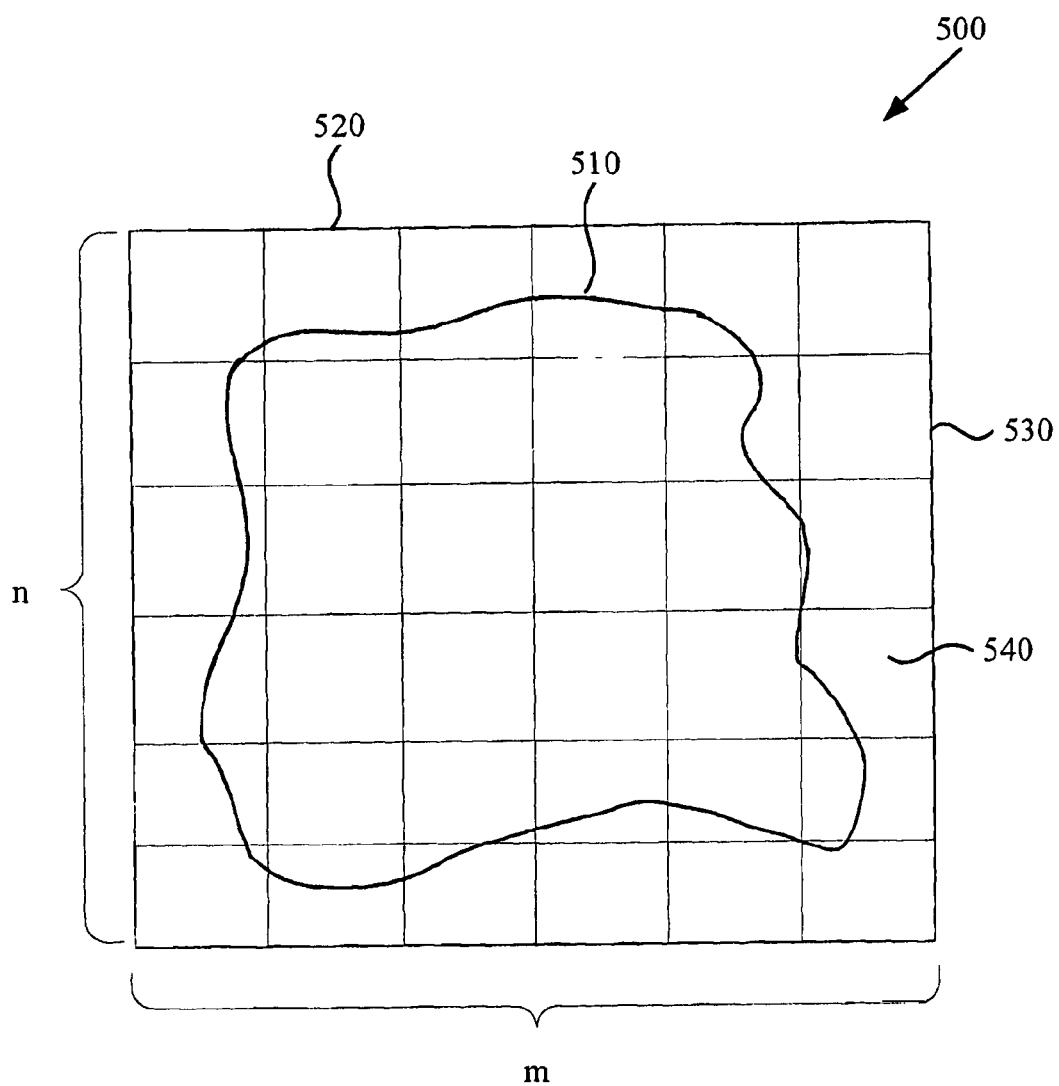
FIG. 7 shows a diagram of one embodiment of a matrix used for segmenting an image into tiles, in accordance with the Adaptive Linear Contrast Method for Enhancement of Low-Visibility Imagery.

FIG. 7 shows a diagram of one embodiment of a matrix 500 used in an adaptive level adjustment process, in accordance with the method for enhancing low-visibility imagery. Matrix 500 may include an image 510 therein, such as the image of methods 10 and 200. Matrix 500 may be divided into m columns 520 and n rows 530, where m and n are integers greater than one. In some embodiments, matrix 500 may be divided into m columns and m rows. Matrix 500 may include n×m cells 540. Image 510 may be segmented into a matrix of n by m sub-images, with each cell 540 containing a sub-image. Matrix 500 provides for the ability to filter image 510 by filtering each of the sub-images located in cells 540 based on calculated image statistics. Breaking down image 510 into sub-images, and filtering each of the sub-images, may allow for higher resolution enhancement of image 510.

Methods 10 and 200 may be stored on a computer readable storage medium, the methods represented by computer readable programming code. Methods 10 and 200 may be implemented using a programmable device, such as a computer-based system. Methods 10 and 200 may be implemented using various programming languages, such as "C" or "C++".

Various computer-readable storage mediums, such as magnetic computer disks, optical computer disks, electronic memories and the like, may be prepared that may contain program instructions that direct a device, such as a computer-based system, to implement the steps of methods 10 and 200. Once an appropriate device has access to the program instructions contained on the computer-readable storage medium, the storage medium may provide the information and programs to the device, enabling the device to perform methods 10 and 200.

For example, if a computer disk containing appropriate materials, such as a source file, an object file, or an executable file is provided to a computer, the computer receives the information, configures itself, and perform the steps of methods 10 and 200. The computer would receive various portions of information from the disk relating to different steps of methods 10 and 200, implement the individual steps, and coordinate the functions of the individual steps.

Many modifications and variations of the Adaptive Linear Contrast Method for Enhancement of Low-Visibility Imagery are possible in light of the above description. Within the scope of the appended claims, the Adaptive Linear Contrast Method for Enhancement of Low-Visibility Imagery may be practiced otherwise than as specifically described. Further, the scope of the claims is not limited to the implementations and embodiments disclosed herein, but extends to other implementations and embodiments as may be contemplated by those having ordinary skill in the art.

We claim:

1. A non-transitory computer readable storage medium having a method encoded thereon, the method represented by computer readable programming code, the method comprising the steps of:
   segmenting an image into a plurality of tiles;
   calculating an upper clip limit and a lower clip limit for each tile of the plurality of tiles based upon a user input standard deviation, wherein
      if the user input standard deviation is zero, then determining a tile mean and a tile standard deviation, wherein if the tile standard deviation is less than about 0.03, then incrementing a standard deviation number by one, if the tile standard deviation is less than about 0.005, then further incrementing the standard deviation number by one, if the tile mean is less than about 0.4, then setting the lower clip limit to about 0.0011 and the upper clip limit to about the tile mean plus the product of the standard deviation number and the tile standard deviation, and if the tile mean is greater than about 0.6, then setting the upper clip limit to about 0.99 and the lower clip limit to about the tile mean minus the product of the standard deviation number and the tile standard deviation,
      if the user input standard deviation is greater than zero, then determining a tile mean and a tile standard deviation, setting the lower clip limit to about the tile mean minus the product of the standard deviation number and the tile standard deviation, and setting the upper clip limit to about the tile mean plus the product of the standard deviation number and the tile standard deviation; and
   generating a lookup table for each tile by linearly mapping the input pixel values of the image to the output pixel values of the image based upon the calculated upper clip limit and lower clip limit.

2. The non-transitory computer readable storage medium of claim 1, wherein the method further comprises the step of processing each tile based upon the generated lookup table.

3. The non-transitory computer readable storage medium of claim 2, wherein the method further comprises the step of generating a processed image by combining each of the processed tiles.

4. The non-transitory computer readable storage medium of claim 3, wherein the method further comprises the step of displaying the processed image on a display.

5. The non-transitory computer readable storage medium of claim 4, wherein the method further comprises the step of, before the step of displaying the processed image on a display, scaling the processed image between zero and one.

6. The non-transitory computer readable storage medium of claim 4, wherein the method further comprises the step of, before the step of displaying the processed image on a display, scaling the processed image based upon the type of the display.

7. The non-transitory computer readable storage medium of claim 1, wherein if the tile mean is greater than or equal to about 0.4 and less than or equal to about 0.6, and the tile standard deviation is less than or equal to about 0.15, the method further comprises the steps of:
   setting the standard deviation number to two;
   setting the lower clip limit to about the tile mean minus the product of the standard deviation number and the tile standard deviation; and
   setting the upper clip limit to about the tile mean plus the product of the standard deviation number and the tile standard deviation.

8. The non-transitory computer readable storage medium of claim 1, wherein the method further comprises the step of, before the step of segmenting the image into a plurality of tiles, performing auto-contrast processing on the image.

9. A non-transitory computer readable storage medium having a method encoded thereon, the method represented by computer readable programming code, the method comprising the steps of:
   segmenting an image into a plurality of tiles;
   calculating an upper clip limit and a lower clip limit for each tile of the plurality of tiles based upon a user input standard deviation, wherein
      if the user input standard deviation is zero, then determining a tile mean and a tile standard deviation, if the tile standard deviation is less than about 0.03, then incrementing a standard deviation number by one, if the tile standard deviation is less than about 0.005, then further incrementing the standard deviation number by one, if the tile mean is less than about 0.4, then setting the lower clip limit to about 0.0011 and the upper clip limit to about the tile mean plus the product of the standard deviation number and the tile standard deviation, if the tile mean is greater than about 0.6, then setting the upper clip limit to about 0.99 and the lower clip limit to about the tile mean minus the product of the standard deviation number and the tile standard deviation, and if the tile mean is greater than or equal to about 0.4 and less than or equal to about 0.6, and the tile standard deviation is less than or equal to about 0.15, then setting the standard deviation number to two, setting the lower clip limit to about the tile mean minus the product of the standard deviation number and the tile standard deviation, and setting the upper clip limit to about the tile mean plus the product of the standard deviation number and the tile standard deviation,
      if the user input standard deviation is greater than zero, then determining a tile mean and a tile standard deviation, setting the lower clip limit to about the tile mean minus the product of the standard deviation number and the tile standard deviation, and setting the upper clip limit to about the tile mean plus the product of the standard deviation number and the tile standard deviation;
   generating a lookup table for each tile of the plurality of tiles by linearly mapping the input pixel values of the image to the output pixel values of the image based upon the calculated upper clip limit and lower clip limit;
   processing each tile of the plurality of tiles based upon the generated lookup table; and generating a processed image by combining each of the processed tiles.

10. The non-transitory computer readable storage medium of claim 9, wherein the method further comprises the step of displaying the processed image on a display.

11. The non-transitory computer readable storage medium of claim 9, wherein the standard deviation number is initially set to three.

12. The non-transitory computer readable storage medium of claim 9, wherein the method further comprises the step of, before the step of segmenting the image into a plurality of tiles, performing auto-contrast processing on the image.

13. The non-transitory computer readable storage medium of claim 9, wherein the method further comprises the step of, before the step of displaying the processed image on a display, scaling the processed image between the values of zero and one.

14. The non-transitory computer readable storage medium of claim 9, wherein the method further comprises the step of, before the step of displaying the processed image on a display, scaling the processed image based upon the type of the display.

15. The non-transitory computer readable storage medium of claim 9, wherein the step of generating a lookup table for each tile of the plurality of tiles includes the step of linearly mapping the pixels of the image based upon the calculated upper clip limit and lower clip limit.

16. A system comprising:
a display;
a processor operatively connected to the display; and
a memory module operatively connected to the processor, the memory module having program instructions stored therein, wherein the program instructions are executable by the processor to perform a method comprising the steps of:
segmenting an image into a plurality of tiles;
calculating an upper clip limit and a lower clip limit for each tile of the plurality of tiles based upon a user input standard deviation, wherein
if the user input standard deviation is zero, then determining a tile mean and a tile standard deviation, wherein if the tile standard deviation is less than about 0.03, then incrementing a standard deviation number by one, if the tile standard deviation is less than about 0.005, then further incrementing the standard deviation number by one, if the tile mean is less than about 0.4, then setting the lower clip limit to about 0.0011 and the upper clip limit to about the tile mean plus the product of the standard deviation number and the tile standard deviation, and if the tile mean is greater than about 0.6, then setting the upper clip limit to about 0.99 and the lower clip limit to about the tile mean minus the product of the standard deviation number and the tile standard deviation,
if the user input standard deviation is greater than zero, then determining a tile mean and a tile standard deviation, setting the lower clip limit to about the tile mean minus the product of the standard deviation number and the tile standard deviation, and setting the upper clip limit to about the tile mean plus the product of the standard deviation number and the tile standard deviation; and
generating a lookup table for each initial tile by linearly mapping the input pixel values of the image to the output pixel values of the image based upon the calculated upper clip limit and lower clip limit.

17. The system of claim 16, wherein if the tile mean is greater than or equal to about 0.4 and less than or equal to about 0.6, and the tile standard deviation is less than or equal to about 0.15, the method further comprises the steps of:
setting the standard deviation number to two;
setting the lower clip limit to about the tile mean minus the product of the standard deviation number and the tile standard deviation; and
setting the upper clip limit to about the tile mean plus the product of the standard deviation number and the tile standard deviation.

18. The system of claim 16, wherein the method further comprises the step of, before the step of segmenting the image into a plurality of tiles, performing auto-contrast processing on the image.

19. The system of claim 16, wherein the method further comprises the step of processing each initial tile based upon the generated lookup table.

20. The system of claim 19, wherein the method further comprises the step of generating a processed image by combining each of the processed tiles.

* * * * *